United States Patent
Hwang

(10) Patent No.: US 7,931,951 B2
(45) Date of Patent: Apr. 26, 2011

(54) CARPET FOR VEHICLE AND METHOD FOR MANUFACTURING SAME

(75) Inventor: Jin Ho Hwang, Seoul (KR)

(73) Assignees: Hyundai Motor Company, Seoul (KR); Dongjin Science & Engineering, Gyeongju-Si (KR)

( * ) Notice: Subject to any disclaimer, the term of this patent is extended or adjusted under 35 U.S.C. 154(b) by 84 days.

(21) Appl. No.: 11/967,503

(22) Filed: Dec. 31, 2007

(65) Prior Publication Data

US 2009/0117320 A1    May 7, 2009

(30) Foreign Application Priority Data

Nov. 7, 2007   (KR) .................. 10-2007-0113310

(51) Int. Cl.
*B32B 3/02* (2006.01)
*B32B 3/24* (2006.01)
*B32B 3/26* (2006.01)
*B32B 5/14* (2006.01)
*B32B 5/26* (2006.01)

(52) U.S. Cl. .......... 428/95; 428/136; 428/137; 428/156; 428/170; 428/171; 428/172; 428/213; 428/218; 428/88

(58) Field of Classification Search .............. 428/67, 428/88, 85, 113, 131, 134, 136, 137, 156, 428/157, 170, 171, 172, 173, 212, 213, 218
See application file for complete search history.

(56) References Cited

U.S. PATENT DOCUMENTS

| | | | | |
|---|---|---|---|---|
| 2,991,212 A | * | 7/1961 | Cotterman et al. ............ | 156/214 |
| 4,336,289 A | * | 6/1982 | Davis ............................ | 428/67 |
| 4,382,986 A | * | 5/1983 | Reuben ......................... | 428/88 |
| 5,389,421 A | * | 2/1995 | Pearlman ...................... | 428/82 |
| 5,587,218 A | * | 12/1996 | Betz ............................. | 428/67 |
| 5,656,109 A | * | 8/1997 | Schilling et al. .............. | 156/63 |
| 6,537,641 B1 | * | 3/2003 | Kroll ............................. | 428/95 |
| 6,849,317 B1 | * | 2/2005 | Oakey et al. .................. | 428/88 |
| 6,905,751 B2 | * | 6/2005 | Jauregui ........................ | 428/89 |
| 2003/0008581 A1 | * | 1/2003 | Tilton et al. .................. | 442/181 |
| 2003/0096079 A1 | * | 5/2003 | Messina et al. ............... | 428/85 |
| 2003/0199216 A1 | * | 10/2003 | Gomez et al. ................. | 442/327 |
| 2006/0003141 A1 | * | 1/2006 | Pacione ......................... | 428/95 |

* cited by examiner

*Primary Examiner* — Cheryl Juska

(74) *Attorney, Agent, or Firm* — Morgan, Lewis & Bockius LLP

(57) ABSTRACT

Disclosed are a carpet for a vehicle and a method of manufacturing the same. A first material is scored to define a gap. A portion of the first material interior to the gap is compressed, and then folded out of the gap. A second material is adhered to the first material. The second material may be adhered to the compressed portion of the first material. The volume of the compressed portion may be decreased by about half. The first material may be a sound-absorbing material.

6 Claims, 1 Drawing Sheet

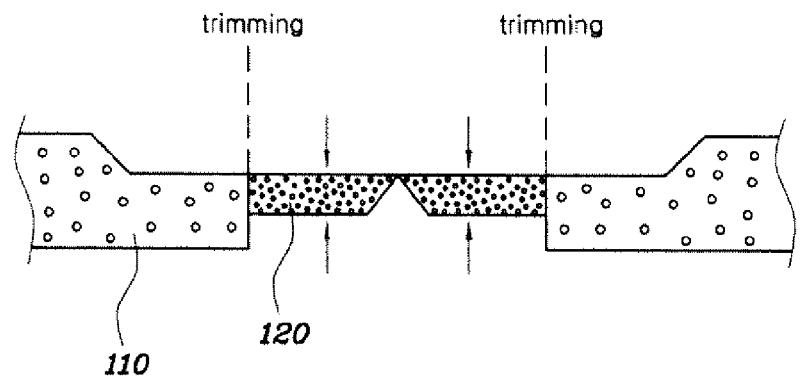
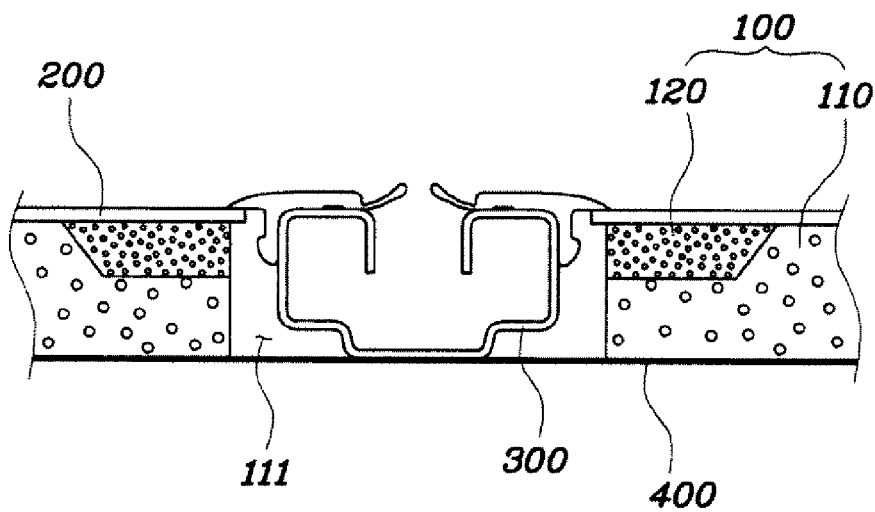
Fig. 3
Forming sound absorbing material including main sound absorbing material and sound absorbing material piece
↓
Trimming sound absorbing material piece from slot defined in sound absorbing material
↓
Integrally forming sound absorbing material piece and main sound absorbing material with carpet material

CARPET FOR VEHICLE AND METHOD FOR MANUFACTURING SAME

CROSS-REFERENCE TO RELATED APPLICATIONS

This application claims priority to Korean Application No. 10-2007-0113310, filed on Nov. 7, 2007, the disclosure of which is incorporated herein by reference.

BACKGROUND OF THE INVENTION

1. Field of the Invention

The present invention relates to a carpet for a vehicle and a method of manufacturing the same.

2. Description of the Related Art

A vehicle typically has a sound absorbing material installed on a dash panel, which separates the engine room from the passenger compartment, to absorb the sound generated in the engine room, and on the floor panel, to absorb sound transmitted through the floor panel from the outside.

The sound absorbing material is generally made of polyethylene terephthalate (PET), which is a good sound absorber as well as a thermal insulator, on the floor panel, PET felt is usually used.

The sound absorbing material is interposed between the floor panel and the carpet. A seat rail is mounted in a seat rail slot, defined in the sound absorbing material and in the carpet.

PET is soft, and compresses when pressure is applied thereto. This is a particular problem if pressure is applied to the carpet on both sides of the seat rail slot: since the strength is compromised near the seat rail slot, the carpet markedly sinks.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Disclosed are a carpet for a vehicle and a method of manufacturing the same. A first material is scored to define a gap. A portion of the first material interior to the gap is compressed, and then folded out of the gap. A second material is adhered to the first material.

The second material may be adhered to the compressed portion of the first material. The volume of the compressed portion may be decreased by about half. The first material may be a sound-absorbing material.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein:

FIG. 1 is a cross-sectional view illustrating a sound absorbing material piece being scored and compressed to form a carpet for a vehicle in accordance with an embodiment of the present invention;

FIG. 2 is a cross-sectional view illustrating the carpet of FIG. 1 mounted to a floor panel; and FIG. 3 is a flow chart of a method of manufacturing a carpet for a vehicle in accordance with another embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION OF PREFERRED EMBODIMENTS

Reference will now be made in detail to preferred embodiments of the present invention, examples of which are illustrated in the accompanying drawings and described below. While the invention will be described in conjunction with exemplary embodiments, it should be understood that the description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims.

Referring to FIGS. 1 and 2, a carpet for a vehicle in accordance with an embodiment of the present invention comprises a sound absorbing material 100 attached to the upper surface of the floor panel 400 of a vehicle, and a carpet material 200 which is attached to the upper surface of the sound absorbing material 100.

The sound absorbing material 100 may function to reduce the noise and vibrations transmitted through the floor panel 400, and may be made of polyethylene terephthalate (PET) felt. The sound absorbing material 100 has a gap or other discontinuity 111 defined therein, such as a seat rail slot, in which a seat rail 300 is mounted.

The sound absorbing material 100 includes a main portion, or main sound absorbing material, 110; and a compressed portion, or sound absorbing material piece, 120.

In the embodiment illustrated in FIG. 1, the sound absorbing material piece 120 is scored or trimmed from the sound absorbing material 100, compressed, and then folded to the configuration shown in FIG. 2. It is preferred that the sound absorbing material piece 120 be compressed so that its volume is decreased by half.

When the sound absorbing material piece 120 is compressed, the volume decreases by half but the weight does not change; therefore the density increases. As a result, the strength of the sound absorbing material 100 near the sound absorbing material piece 120 is attached, is reinforced.

Referring to FIG. 3, in a method for manufacturing a carpet for a vehicle according to an embodiment of the present invention, the sound absorbing material 100 including the main sound absorbing material 110 and the compressed sound absorbing material piece 120 is formed such as by using a mold. Then, after the compressed sound absorbing material piece 120 is trimmed from the slot 111 defined in the sound absorbing material 100, the main sound absorbing material 110 and the compressed sound absorbing material piece 120 are integrally molded together with the carpet material 200, whereby the manufacture of the carpet for a vehicle is completed.

As is apparent from the above description, embodiments of the present invention provide a durable carpet with low manufacturing cost.

Although preferred embodiments of the present invention have been described for illustrative purposes, those skilled in the art will appreciate that various modifications, additions and substitutions are possible, without departing from the scope and spirit of the invention as defined in the accompanying claims.

What is claimed is:

1. A carpet support pad, comprising:
    a main pad having a first portion which has a first thickness and a second portion which has a second thickness, the second portion being of a longitudinal strip-shape and having thickness thinner than the first thickness, the main pad having at least one longitudinal slot formed within the second portion along the longitudinal strip-shape of the second portion;
    a reinforcing pad attached to an upper surface of the second portion of the main pad along a periphery of the longitudinal slots; and
    a carpet material covering the upper surface of the main pad and the reinforcing pad;
    wherein the main pad and the reinforcing pad are felt.

2. The carpet support pad of claim 1, wherein the reinforcing pad is made of same material with the main pad, wherein the thickness of the reinforcing pad is thinner than that of the main pad but the density of the reinforcing pad is higher than that of the main pad, thereby the carpet is reinforced along the periphery of the longitudinal slots by the reinforcing pad.

3. The carpet support pad of claim 1, wherein the reinforcing pad is made of same material with the main pad, wherein the thickness of the reinforcing pad is same with the difference between the thicknesses of the first portion and the second portion, and the density of the reinforcing pad is about double of the density of the main pad.

4. The carpet support pad of claim 1, wherein the density of the reinforcing pad is about double of the density of the main pad.

5. The carpet support pad of claim 2, wherein the main pad and the reinforcing pad are made of polyethylene terephthalate.

6. The carpet support pad of claim 1, wherein the felt is polyethylene terephthalate.

\* \* \* \* \*